US009396340B2

(12) United States Patent
Chen et al.

(10) Patent No.: US 9,396,340 B2
(45) Date of Patent: Jul. 19, 2016

(54) METHOD FOR ENCRYPTING A 3D MODEL FILE AND SYSTEM THEREOF

(71) Applicant: INVENTEC APPLIANCES CORP., New Taipei (TW)

(72) Inventors: Hao Chen, Shanghai (CN); Li Yu, Shanghai (CN); Shih-Kuang Tsai, Taipei (TW)

(73) Assignee: INVENTEC APPLIANCES CORP., Taipei (TW)

( * ) Notice: Subject to any disclaimer, the term of this patent is extended or adjusted under 35 U.S.C. 154(b) by 0 days.

(21) Appl. No.: 14/333,907

(22) Filed: Jul. 17, 2014

(65) Prior Publication Data

US 2015/0332058 A1 Nov. 19, 2015

(30) Foreign Application Priority Data

May 13, 2014 (CN) .......................... 2014 1 0200890

(51) Int. Cl.
| G06F 21/00 | (2013.01) |
| G06F 21/60 | (2013.01) |
| H04L 9/06 | (2006.01) |
| G06F 21/62 | (2013.01) |
| G06F 11/30 | (2006.01) |
| G06T 17/00 | (2006.01) |

(52) U.S. Cl.
CPC .......... *G06F 21/602* (2013.01); *G06F 21/6209* (2013.01); *H04L 9/06* (2013.01)

(58) Field of Classification Search
None
See application file for complete search history.

(56) References Cited

U.S. PATENT DOCUMENTS

| 6,236,403 | B1 * | 5/2001 | Chaki et al. ................... 345/420 |
| 2011/0285708 | A1 * | 11/2011 | Chen et al. ................... 345/420 |
| 2012/0001789 | A1 * | 1/2012 | Schilling et al. ............... 342/54 |
| 2012/0117514 | A1 * | 5/2012 | Kim et al. ..................... 715/849 |
| 2012/0299915 | A1 * | 11/2012 | Eluard et al. .................. 345/420 |
| 2014/0115345 | A1 * | 4/2014 | Maetz et al. .................. 713/189 |
| 2014/0119538 | A1 * | 5/2014 | Maetz et al. ................... 380/28 |
| 2014/0168360 | A1 * | 6/2014 | Ahn et al. ...................... 348/42 |

FOREIGN PATENT DOCUMENTS

| CN | 102855657 | 1/2013 |
| TW | 200519704 A | 6/2005 |

* cited by examiner

*Primary Examiner* — Shin-Hon Chen
(74) *Attorney, Agent, or Firm* — Foster Pepper PLLC; Richard A. Koske; P. G. Scott Born

(57) ABSTRACT

The invention discloses a method for encrypting a 3D model file and system thereof. The system of the invention comprises a data reading module used to read data of the 3D model file; a mesh shifting module for selecting at least one triangle mesh and shifting the coordinates of the vertexes of the selected triangle mesh by a vector; a gap filling module for filling a gap generated from shifting the vertexes of the selected triangle mesh by the vector to generate a revised 3D model file; and a model generating module for storing the revised 3D model file to generate an encrypted 3D model file. Compared to the prior art, the invention provides the users for previewing the 3D model file, and the invention only provides the authorized users for correctly printing the original 3D model. Therefore, the invention can achieve the purpose for encrypting the 3D model file.

8 Claims, 4 Drawing Sheets

METHOD FOR ENCRYPTING A 3D MODEL FILE AND SYSTEM THEREOF

PRIORITY CLAIM

This application claims the benefit of the filing date of Taiwan Patent Application No. 201410200890.0, filed May 13, 2014, entitled "A METHOD FOR ENCRYPTING A 3D MODEL FILE AND SYSTEM THEREOF," and the contents of which are hereby incorporated by reference in their entirety.

FIELD OF THE INVENTION

The present invention relates to a 3D model file, more particularly, to a method for encrypting a 3D model file and system thereof.

BACKGROUND 3D printing is a rapid prototyping technology. The data of 3D model file produced by designer can be inputted to 3D printer for applying molding materials such as metal or plastic in powder shape etc. to print layer by layer and form a 3D entity model. Such technologies in the industry are also known as additive manufacturing, and have the advantage to form object in any shape.

Due to the rapid development and the importance of the 3D printing technology, a variety of 3D printing technologies are developed according to different needs of customers by manufacturers. However, the conventional 3D model files are mostly in unprotected state. When these files are published to the Internet for users, any user can read the data of these files by 3D printing system and then print and generate the 3D entity model. Therefore results of the work of the designer and assets of the owner are not given appropriate protection.

The conventional methods for protecting the 3D model file are encrypting the file so that the unauthorized user cannot entirely get the contents of the 3D model file. As shown in China patent application publication No. CN102855657 discloses a method and device for 3D object protection by transformation of its points. The invention is directed to a method of protecting a graphical object and comprises the following step: obtaining a protected graphical object; generating a translation vector and transforming the point by adding the point to the translation vector; and outputting the protected graphical object. In one preferred embodiment, the graphical object is a three-dimensional object.

However, the conventional method and equipment for encrypting the 3D model file, in practical application, the visual appearances of the original 3D model and the encrypted 3D model are different. Furthermore, makes it difficult to specifically recognize the original shape of the encrypted 3D model. While providing a preview image of the encrypted 3D model to a buyer, it would be hard for the buyer to decide whether to buy the 3D model or not.

SUMMARY OF THE INVENTION

Thus, the present invention provides a method for encrypting a 3D model file and system thereof, through shifting coordinates of vertexes of a triangle mesh of the 3D model file by a vector, and filling a gap generated from shifting the vertex of the triangle mesh by a plurality of filling triangle meshes, for generating a revised 3D model file to form an sealed 3D model.

The present invention further provides a method for encrypting a 3D model file and comprises the following steps: (S1) reading data of the 3D model file, the 3D model file comprising a plurality of triangle meshes, the data comprising corresponding coordinates of vertexes of each triangle mesh; (S2) selecting at least one triangle mesh and shifting the coordinates of the vertexes of the selected triangle mesh by a vector; (S3) filling a gap generated from shifting the vertexes of the selected triangle mesh for generating a revised 3D model file; and (S4) storing the revised 3D model file for generating an encrypted 3D model file, wherein the step (S3) is generating a plurality of filling triangle meshes for filling the gap generated from shifting the vertexes of the selected triangle mesh.

The present invention provides the method for encrypting the 3D model file, further comprises the following steps: (S5) determining whether it is authorized for browsing or printing the encrypted 3D model file; (S6) if the determined result of the step (S5) is "YES", decrypting the encrypted 3D model file for restoring the encrypted 3D model file to the 3D model file; and (S7) outputting the 3D model file for browsing or printing.

Additionally, the present invention further provides a system for encrypting the 3D model file and comprises a data reading module, a mesh shifting module, a gap filling module, and a model generating module. The data reading module is used to read data of the 3D model file, wherein the 3D model file comprises a plurality of triangle meshes, the data comprises corresponding coordinates of vertexes of each triangle mesh. The mesh shifting module is connected to the data reading module, for selecting at least one triangle mesh and shifting the coordinates of the vertexes of the selected triangle mesh by a vector. The gap filling module is connected to the data reading module and the mesh shifting module, for filling a gap generated from shifting the vertexes of the selected triangle mesh by the vector to generate a revised 3D model file. And the model generating module is connected to the data reading module, the mesh shifting module, and the gap filling module, for storing the revised 3D model file to generate an encrypted 3D model file. Wherein a plurality of filling triangle meshes are generated by the gap filling module for filling the gap generated from shifting the selected triangle mesh by the vector to generate the revised 3D model file.

The present invention provides the system for encrypting the 3D model file, further comprising an authority determining module and a mesh restoring module. The authority determining module is connected to the model generating module, for determining whether it is authorized for browsing or printing the encrypted 3D model file, if "NO", outputting the encrypted 3D model file for browsing or printing. And the mesh restoring module is connected to the authority determining module, for restoring the encrypted 3D model file to the 3D model file if it is authorized to browse or print the encrypted 3D model file.

In conclusion, compared to the prior art, the present invention provides a method for encrypting a 3D model file and system thereof. Users may browse the encrypted 3D model file with a 3D modeling software, but the encrypted 3D model file cannot be restored or decrypted without authorization. Under this circumstance, if a user prints the encrypted 3D model file with a 3D printer, the surface of the printed 3D model will be rough, and the differences between the printed 3D model and the original 3D model will be presented. Because the sealed encrypted 3D model file cannot be correctly printed yet can be visually recognized, the invention can achieve the purpose for encrypting the 3D model file and improve the disadvantage of the prior art.

DETAILED DESCRIPTION

Figure 1:
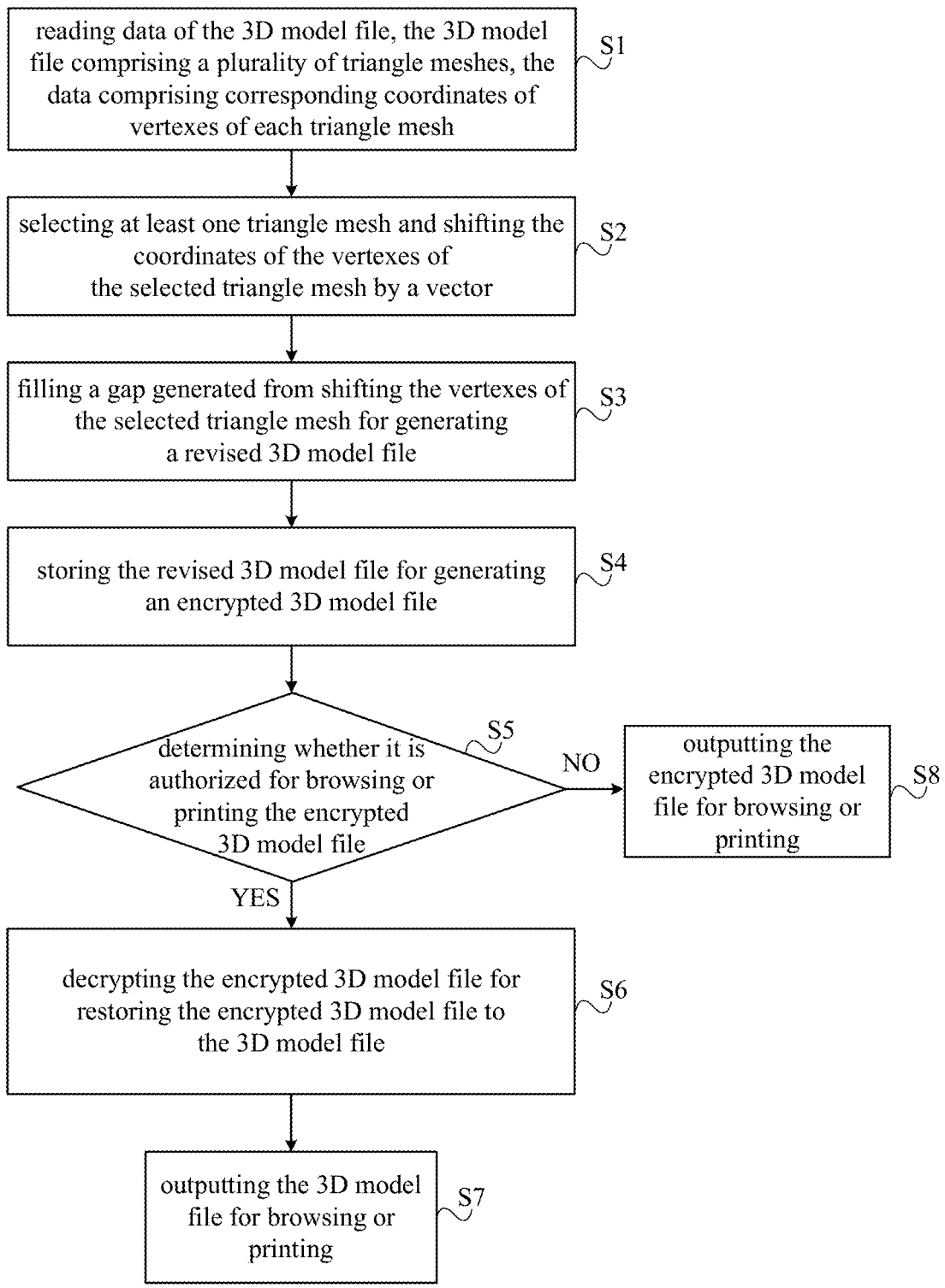
FIG. 1 is a method flow chart illustrating a method for encrypting a 3D model file of the present invention according to one preferred embodiment.

Please refer to FIG. 1. FIG. 1 is a flow chart illustrating a method for encrypting a 3D model file of the present invention according to one preferred embodiment. As shown in the figure, the method for encrypting the 3D model file comprises the following steps: (S1) reading data of the 3D model file, the 3D model file comprising a plurality of triangle meshes, the data comprising corresponding coordinates of vertexes of each triangle mesh; (S2) selecting at least one triangle mesh and shifting the coordinates of the vertexes of the selected triangle mesh by a vector; (S3) filling a gap generated from shifting the vertexes of the selected triangle mesh for generating a revised 3D model file; and (S4) storing the revised 3D model file for generating an encrypted 3D model file, wherein the step (S3) is generating a plurality of filling triangle meshes for filling the gap generated from shifting the vertexes of the selected triangle mesh. In the present embodiment, the 3D model file is an STL file, but is not limited thereto, in practical applications, the 3D model file may also be a file form for WRL, PLY, OBJ, FBX, DAE, STP, IGS, etc.

Figure 2:
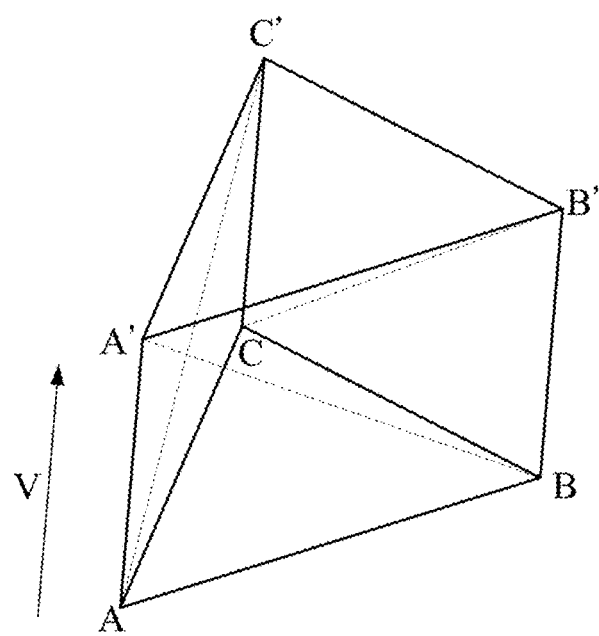
FIG. 2 is a schematic view illustrating a triangle mesh shifted by a vector and filled a gap of the present invention according to one preferred embodiment.

FIG. 2 is a schematic view illustrating a triangle mesh shifted by a vector and filled a gap of the present invention according to one preferred embodiment. Please refer to FIG. 1 and FIG. 2. In the step (S1), step (S1) is reading the data of the 3D model file, wherein the 3D model file comprises a triangle mesh ABC, and the data of the 3D model file comprises corresponding coordinates of vertexes of the triangle mesh ABC which are A (125, 30, 30), B (145, 45, 30), and C (130, 60, 30), but the coordinates of the triangle mesh ABC are not limited thereto. The parameter settings of the coordinate can be appropriately adjusted according to the case. In the step (S2), step (S2) is selecting the triangle mesh ABC and shifting the coordinates of the vertexes of the selected triangle mesh ABC by a vector V (0, 0, 35), but the vector is not limited thereto. The parameter settings of the vector can be appropriately adjusted according to the case, in the present embodiment, the vector may be (0, 0, K), and K is a natural number. Then, a corresponding triangle mesh A'B'C' is generated from shifting the triangle mesh ABC by the vector V (0, 0, 35). The coordinates of vertexes of the triangle mesh A'B'C' are A' (125, 30, 65), B' (145, 45, 65), and C' (130, 60, 65). Step (S3) is generating a plurality of filling triangle meshes for filling the gap generated from shifting the vertexes of the selected triangle mesh ABC by the vector V (0, 0, 35). Wherein the plurality of filling triangle meshes are a filling triangle mesh A'AB, a filling triangle mesh B'A'B, a filling triangle mesh B'CB, a filling triangle mesh B'C'C, a filling triangle mesh C'AC, and a filling triangle mesh C'A'A. But the plurality of filling triangle meshes are not limited to above combination, may also have different combinations according to the case.

Then, please further refer FIG. 1, the method for encrypting the 3D model file of the embodiment of the present invention further comprises the following steps: (S5) determining whether it is authorized for browsing or printing the encrypted 3D model file; (S6) if the determined result of the step (S5) is "YES", decrypting the encrypted 3D model file for restoring the encrypted 3D model file to the 3D model file, wherein the step (S6) further comprises the following steps of: eliminating the filling triangle meshes of the encrypted 3D model; and restoring the shifted vertexes of the selected triangle mesh to their original coordinates by the vector; and (S7) outputting the 3D model file for browsing or printing, wherein if the determined result of the step (S5) is "NO", then to execute step (S8) outputting the encrypted 3D model file for browsing or printing.

Figure 3A:
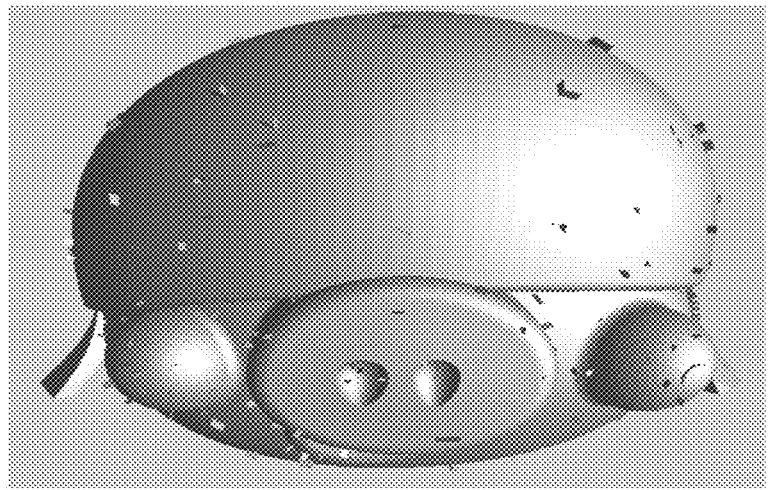
FIG. 3A is a schematic view illustrating a 3D model file in unauthorized state of the present invention according to one preferred embodiment.
Figure 3B:
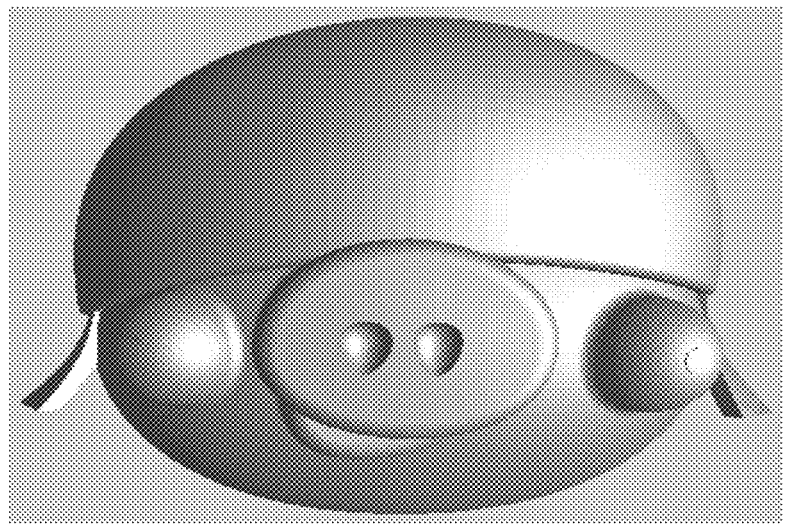
FIG. 3B is a schematic view illustrating a 3D model file in authorized state of the present invention according to one preferred embodiment.

Then, please refer FIG. 3A and FIG. 3B. FIG. 3A is a schematic view illustrating a 3D model file in unauthorized state of the present invention according to one preferred embodiment. FIG. 3B is a schematic view illustrating a 3D model file in authorized state of the present invention according to one preferred embodiment. When the encrypted 3D model file in unauthorized state is outputted by step (S8) without restoring to the original 3D model file, the user may only preview the encrypted 3D model file with the shape similar to the original 3D model file. And the surface of 3D model printed from the encrypted 3D model file by a 3D printer will be rough, and the differences between the printed 3D model and the original 3D model will be presented. At the same times, because the encrypted 3D model file is in unauthorized state, it cannot be restored to the original 3D model file by user. In other words, the original 3D model file is outputted through step (S7) when the encrypted 3D model file is in authorized state, the encrypted 3D model file is restored to the original 3D model file. The user can browse the original 3D model file and print an original 3D model.

Figure 4:
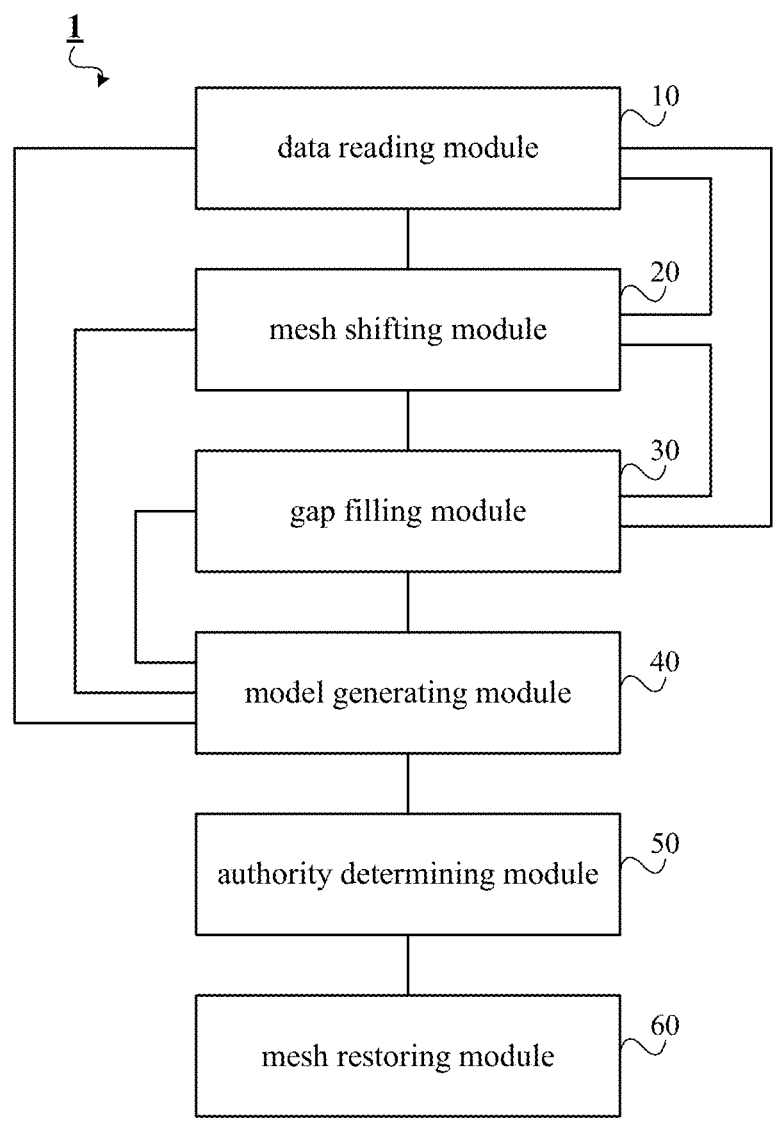
FIG. 4 is a schematic view illustrating a system for encrypting a 3D model file of the present invention according to one preferred embodiment.

Please refer to FIG. 4. FIG. 4 is a schematic view illustrating a system for encrypting a 3D model file of the present invention according to one preferred embodiment. As shown in the figure, a system 1 for encrypting the 3D model file of the present invention comprises a data reading module 10, a mesh shifting module 20, a gap filling module 30, a model generating module 40, an authority determining module 50, and a mesh restoring module 60.

The data reading module 10 is used to read data of the 3D model file, wherein the 3D model file comprises a plurality of triangle meshes, the data comprises corresponding coordinates of vertexes of each triangle mesh.

The mesh shifting module 20 is connected to the data reading module 10, for selecting at least one triangle mesh and shifting the coordinates of the vertexes of the selected triangle mesh by a vector.

The gap filling module 30 is connected to the data reading module 10 and the mesh shifting module 20, for filling a gap generated from shifting the vertexes of the selected triangle mesh by the vector to generate a revised 3D model file.

The model generating module 40 is connected to the data reading module 10, the mesh shifting module 20, and the gap filling module 30, for storing the revised 3D model file to generate an encrypted 3D model file, wherein a plurality of filling triangle meshes are generated by the gap filling module 30 for filling the gap generated from shifting the selected triangle mesh by the vector to generate the revised 3D model file. The vector is (0, 0, K), and K is a natural number.

The authority determining module 50 is connected to the model generating module 40, for determining whether it is authorized for browsing or printing the encrypted 3D model file, if "NO", outputting the encrypted 3D model file for browsing or printing.

And the mesh restoring module 60 is connected to the authority determining module 50, for restoring the encrypted 3D model file to the 3D model file if it is authorized to browse or print the encrypted 3D model file, wherein the mesh restoring module 50 further eliminates the filling triangle meshes, and restores the shifted vertexes of the selected triangle mesh to their original coordinates by the vector for restoring the encrypted 3D model file to the 3D model file.

The method for encrypting a 3D model file and system thereof are through shifting coordinates of vertexes of triangle mesh by a vector, and filling a gap generated from shifting the vertexes of the triangle mesh by a plurality of filling triangle meshes, for generating a revised 3D model file to form a encrypted 3D model file with a sealed exterior. Compared to the prior art, the invention provides the authorized and unauthorized users for previewing the 3D model file, besides, the invention provides the authorized and unauthorized users for getting 3D entity models with different printing quality. Therefore, the invention can achieve the purpose for encrypting the 3D model file to improve the disadvantage of the prior art.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the meets and bounds of the appended claims.

The invention claimed is:

1. A computer-implemented method for encrypting 3D model file, comprising the following steps of:
   reading data of the 3D model file, the 3D model file comprising a plurality of triangle meshes, the data comprising corresponding coordinates of vertexes of each triangle mesh;
   selecting at least one triangle mesh and shifting the coordinates of the vertexes of the selected triangle mesh by a vector, wherein the vector is (0, 0, K), and K is a natural number excluding 0;
   generating a plurality of filling triangle meshes;
   filling a gap generated from shifting the vertexes of the selected triangle mesh, with the filling triangle meshes, for generating a revised 3D model file;
   storing the revised 3D model file for generating an encrypted 3D model file.

2. The method for encrypting the 3D model file of claim 1, further comprising the following steps of:
   determining whether it is authorized for browsing or printing the encrypted 3D model file;
   if "YES", decrypting the encrypted 3D model file for restoring the encrypted 3D model file to the 3D model file; and
   outputting the 3D model file for browsing or printing.

3. The method for encrypting the 3D model file of claim 2, wherein the step of decrypting the encrypted 3D model file for restoring the encrypted 3D model file to the 3D model file comprises the following steps of:
   eliminating the filling triangle meshes of the encrypted 3D model; and
   restoring the shifted vertexes of the selected triangle mesh to their original coordinates by the vector.

4. The method for encrypting the 3D model file of claim 2, wherein after the step of determining whether it is authorized for browsing or printing the encrypted 3D model file, the method further comprises the following step of:
   if "NO", outputting the encrypted 3D model file for browsing or printing.

5. A system for encrypting a 3D model file, comprising:
   a processor;
   a memory storing instructions thereon to cause the processor to implement:
      a data reading module, used to read data of the 3D model file, the 3D model file comprising a plurality of triangle meshes, the data comprising corresponding coordinates of vertexes of each triangle mesh;
      a mesh shifting module, connected to the data reading module, for selecting at least one triangle mesh and shifting the coordinates of the vertexes of the selected triangle mesh by a vector, wherein the vector is (0, 0, K), and K is a natural number excluding 0;
      a gap filling module, connected to the data reading module and the mesh shifting module, for generating a plurality of filling triangle meshes, and for filling a gap generated from shifting the vertexes of the selected triangle mesh by the vector, with the filling triangle meshes, to generate a revised 3D model file; and
      a model generating module, connected to the data reading module, the mesh shifting module and the gap filling module, for storing the revised 3D model file to generate an encrypted 3D model file.

6. The system for encrypting the 3D model file of claim 5, further comprising:
   an authority determining module, connected to the model generating module, for determining whether it is authorized for browsing or printing the encrypted 3D model file, if "NO", outputting the encrypted 3D model file for browsing or printing.

7. The system for encrypting the 3D model file of claim 5, further comprising:
   a mesh restoring module, connected to the authority determining module, for restoring the encrypted 3D model file to the 3D model file if it is authorized to browse or print the encrypted 3D model file.

8. The system for encrypting the 3D model file of claim 7, wherein the mesh restoring module further eliminates the filling triangle meshes, and restores the shifted vertexes of the selected triangle mesh to their original coordinates by the vector for restoring the encrypted 3D model file to the 3D model file.

* * * * *